Feb. 18, 1969 S. E. MANECKE 3,428,932
THERMOSTATIC CONTROL DEVICE AND PARTS THEREFOR
Original Filed April 20, 1964
Sheet 1 of 2
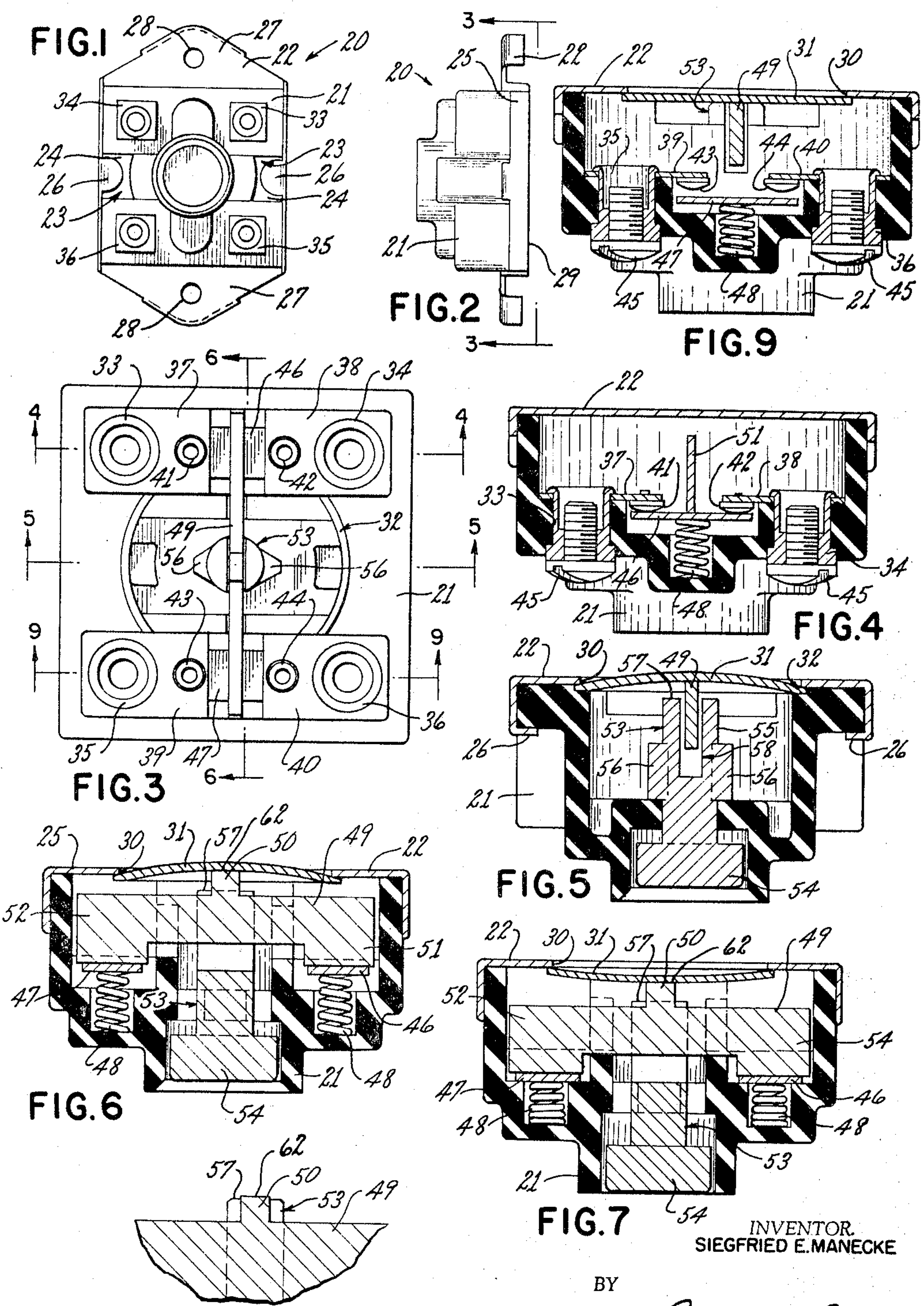
INVENTOR.
SIEGFRIED E. MANECKE
BY
Caudn & Caudn
HIS ATTORNEYS

INVENTOR.
SIEGFRIED E. MANECKE

BY

Caudn & Caudn
HIS ATTORNEYS

United States Patent Office 3,428,932

Patented Feb. 18, 1969

3,428,932

THERMOSTATIC CONTROL DEVICE AND PARTS THEREFOR

Siegfried E. Manecke, 1704 Church St., Indiana, Pa. 15701

Continuation of application Ser. No. 548,280, May 6, 1966, which is a division of application Ser. No. 361,141, Apr. 20, 1964, now Patent No. 3,272,946. This application Nov. 20, 1967, Ser. No. 684,562

U.S. Cl. 337—348 7 Claims

Int. Cl. *37/20*

ABSTRACT OF THE DISCLOSURE

This disclosure relates to a high limit thermostatic switch construction which will open the electrical circuit passing therethrough when a certain temperature is sensed by a control element of the device, the device having a reset member for resetting the control member back to its circuit closing position once the circuit has been opened by the control member snapping over center and remaining over center when sensing an unsafe temperature. However, the reset member will not cause the control member to move back over center unless the control member senses a safe temperature, the reset member preventing a false closing of the circuit during an attempted resetting operation if the control member will not snap back over center because the same is still sensing an unsafe temperature.

This application is a continuation of application Ser. No. 548,280, filed May 6, 1966, which is a division of patent application Ser. No. 361,141, filed Apr. 20, 1964, now U.S. Patent No. 3,272,946, and assigned to the same assignee as this application.

This invention relates to an improved manually reset thermostatic control device as well as to improved parts for such a control device or the like.

It is well known that manually reset thermostatic control devices are provided wherein a thermostatic member of the device is adapted to open electrical contact means of the device when the thermostatic member senses a temperature above a predetermined temperature whereby the contact means remain in the open condition thereof until a manually operated reset button or the like is moved to its resetting position to reset the thermostatic member so that the contact means can move to their closed position.

While such thermostatic control devices have many wide uses and applications thereof, one such use is to utilize the manually reset thermostatic control device in combination with a water heater thermostatic means so that when the thermostatic member of the manually reset thermostatic control device senses that the temperature of the water heater tank has exceeded a predetermined safe limit, the manually reset thermostatic control device terminates the operation of the heater means of the water heater tank until the manually reset thermostatic control device is manually reset.

However, it has been found that such prior known manually reset thermostatic control devices permit the contact means thereof to close when the reset member is moved to its resetting position even though the thermostatic member thereof has not been cooled sufficiently to let the same be reset by the reset member whereby current is permitted to flow through the thermostatic device when the reset member is moved to its reseting position even though the thermostatic member is sensing a temperature which requires the thermostatic control device to terminate the flow of the electrical current therethrough. Thus, it can be seen that such prior known thermostatic control devices can provided unsafe conditions.

However, according to the teachings of this invention, an improved manually reset thermostatic control device is provided wherein the contact means thereof will not close when the reset member is moved to the resetting position and the thermostatic member has not cooled sufficiently to permit the same to be reset.

Accordingly, it is an object of this invention to provide an improved manually reset thermostatic control device having one or more of the novel features of this invention as set forth above or hereinafter shown or described.

Another object of this invention is to provide improved parts for such a thermostatic control device or the like.

Other objects, uses and advantages of this invention are apparent from a reading of this description which proceeds with reference to the accompanying drawings forming a part thereof and wherein:

FIGURE 1 is a top view of one embodiment of the improved thermostatic control device of this invention.

FIGURE 2 is a side view of the device illustrated in FIGURE 1.

FIGURE 3 is an enlarged rear view of the device illustrated in FIGURE 1 and as taken in the direction of the arrows 3—3 of FIGURE 2.

FIGURE 4 is a cross-sectional view taken on line 4—4 of FIGURE 3.

FIGURE 5 is a cross-sectional view taken on line 5—5 of FIGURE 3.

FIGURE 6 is a cross-sectional view taken on line 6—6 of FIGURE 3.

FIGURE 7 is a view similar to FIGURE 6 and illustrates the device in another operating position thereof.

FIGURE 8 is a fragmentary cross-sectional view illustrating the relationship of the actuating member of this invention together with the reset member thereof.

FIGURE 9 is a view similar to FIGURE 4 and is taken on line 9—9 of FIGURE 3, FIGURE 9 illustrating the control device in an operating position different than the operating position illustrated in FIGURE 4.

Figure 10:
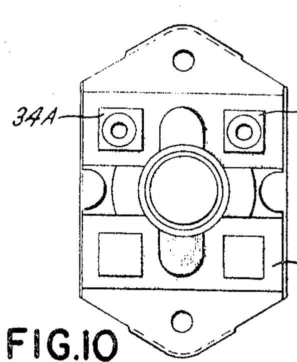
FIGURE 10 is a view similar to FIGURE 1 and illustrates another embodiment of the control device of this invention.
Figure 11:
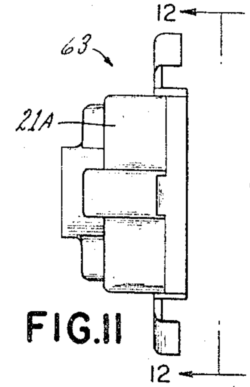
FIGURE 11 is a side view of the device illustrated in FIGURE 10.

While the various features of this invention are hereinafter described and illustrated as being particularly adaptable to provide a manually reset means for an electrical control device, it is to be understood that the various features of this invention can be utilized singly or in any combination thereof to provide structure for other types of control devices or the like.

Therefore, this invention is not to be limited to only the embodiments illustrated in the drawings, because the drawings are merely utilized to illustrate one of the wide variety of uses of this invention.

Referring now to FIGURE 1, the improved manually reset thermostatic control device of this invention is generally indicated by the reference numeral 20 and comprises a housing 21 suitably attached to a mounting bracket 22 that is adapted to partially close the rear surface of the housing 21 in a manner hereinafter described.

In particular, the housing 21 has a pair of opposed recesses 23 provided therein and defining shoulders 24.

The mounting bracket 22 is adapted to be disposed against the rear surface thereof and has outwardly extending flange means 25 which are disposed around the four sides of the housing 21 in the manner illustrated in FIGURE 2 so that the housing 21 is substantially received in a cup-shaped portion of the mounting bracket 22. Thereafter, a pair of ears 26 extending from the side flanges 25 of the mounting bracket 22 are bent inwardly into the recesses 23 of the housing 21 to be disposed against the shoulders 24 thereof and interconnect and fasten the bracket 22 to the housing 21.

The bracket 22 has outwardly directed flanges 27 respectively provided with mounting means 28 whereby the control device 20 is adapted to be mounted to any supporting structure by suitable fastening members passing through the aperture 28 of the mounting bracket 22.

Therefore, it can be seen that the plate-like portion 29 of the mounting bracket 22 provides a cover means for the rear side of the housing 21, the bracket 22 having a circular opening 30 passing through the rear plate 29 thereof to expose a thermostatic member 31 of the control device 20 for a purpose hereinafter descibed. While the plate-like potion 29 of the mounting bracket 22 closes the rear side of the housing 21, the same also provides means for holding the disc-shaped bi-metallic thermostatic member 31 in suitable recesses 32 formed in the housing 21.

The housing 21 has four terminal posts 33, 34, 35 and 36 carried thereby and respectively elecrtically interconnected to plate-like members 37, 38, 39 and 40 respectively carrying electrical contacts 41, 42, 43 and 44.

Suitable electrical leads are adapted to be interconnected to the terminal posts 33–36 by threaded fastening members 45 carried by the posts 33–36.

The control device 20 of this invention is adapted to electrically interconnect the terminal posts 33 and 34 by a bridging member 46 and the terminal posts 35 and 36 by a bridging member 47 when the thermostatic control member 31 is disposed in the snapped position illustrated in FIGURE 5 in a manner hereinafter described, the bridging member 46 being placed in electrical contact with the contacts 41 and 42 and the bridging member 47 being placed in electrical contact with the contacts 43 and 44.

In order to maintain the bridging members 46 and 47 in contact with the contacts 41–44, suitable compression springs 48 are carried by the housing 21 and continually urge the bridging members 46 and 47 upwardly in the manner illustrated in FIGURES 4 and 6 to electrically interconnect the terminals 33, 34 and 35, 36 together.

A substantially Y-shaped yoke or actuating member 49 is carried by the housing 21 and has its base leg 50 normally disposed in engagement with the under side of the thermostatic member 31 and the branch legs 51 and 52 respectively disposed in engagement with the bridging members 46 and 47 in the manner illustrated in FIGURE 6.

Thus, when the thermostatic member 31 snaps over center in one direction from the position illustrated in FIGURE 6 to the position illustrated in FIGURE 7 upon the thermostatic member 31 sensing a temperature above a predetermined temperature, the actuating member 49 is moved downwardly in the manner illustrated in FIGURE 7 to move the bridging members 46 and 47 downwardly in opposition to the force of the compression springs 48 to open the respective pair of contacts 41, 42 and 43, 44 whereby electrical current through the control device 20 is terminated.

Once the thermostatic member 31 has snapped over center from the position illustrated in FIGURE 6 to the position illustrated in FIGURE 7, the thermostatic member 31 remains in the snapped condition illustrated in FIGURE 7 until the same is manually reset in a manner hereinafter described regardless of a change in temperature whereby the thermostatic member 31 prevents the control device 20 from transmitting electrical current therethrough until the thermostatic member 31 has been reset in a manner hereinafter described.

Figure 16:
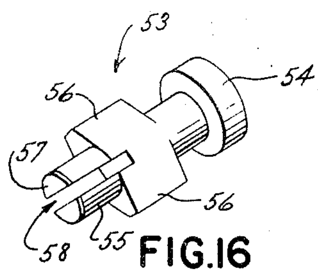
FIGURE 16 is a perspective view of the reset member of this invention.
Figure 12:
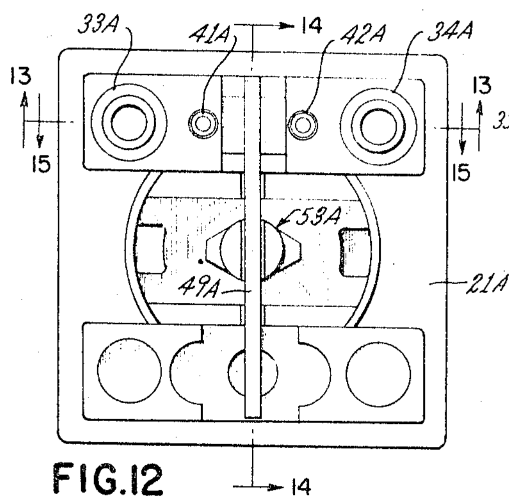
FIGURE 12 is an enlarged rear view of the device illustrated in FIGURE 10 and as taken in the direction of the arrows 12—12 of FIGURE 11.
Figure 13:
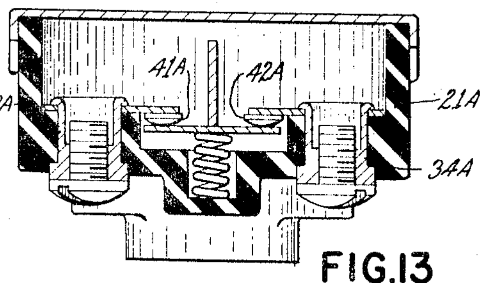
FIGURE 13 is a cross-sectional view taken on line 13—13 of FIGURE 12.
Figure 14:
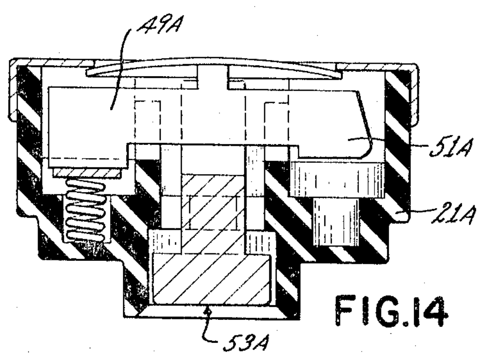
FIGURE 14 is a cross-sectional view taken on line 14—14 of FIGURE 12.
Figure 15:
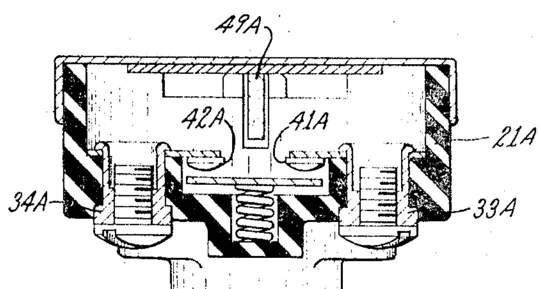
FIGURE 15 is a cross-sectional view taken on line 15—15 of FIGURE 12 and illustrates the control device in an operating position different than FIGURE 14.

As illustrated in FIGURE 16, a reset member 53 is provided by this invention and comprises a button portion 54 having a shaft-like portion 55 extending from one side thereof, the shaft-like portion 55 having outwardly directed opposed flange means 56 disposed spaced from the button portion 54 thereof as well as spaced from the free end 57 of the shaft portion 55.

In addition, a slot 58 is formed in the shaft portion 55 of the reset member 53 and extends from the free end 57 thereof toward the button portion 54 in the manner illustrated in FIGURE 16.

Figure 18:
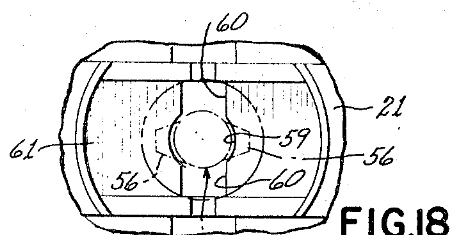
FIGURES 17 and 18 are respectively fragmentary rear views of the housing of this invention and illustrate the manner of locking the reset member of FIGURE 16 relative thereto.
Figure 17:
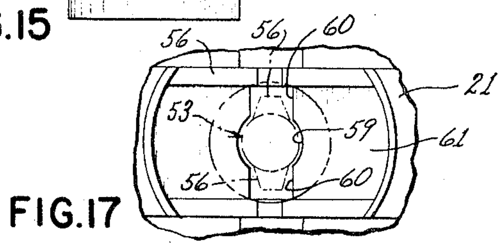

The housing 21 has a substantially circular opening 59 passing therethrough and interconnected to opposed slots 60 in the manner illustrated in FIGURE 17 and 18.

The reset member 53 is adapted to be assembled to the housing 21 by rotating the same to the position illustrated in dotted lines in FIGURE 17 so that the shaft portion 55 and flanges 56 thereof can be telescoped through the opening 59 and slots 60 until the flanges 56 have passed beyond the wall 61 of the housing 21.

Thereafter, the locking member 53 is rotated 90° from the position illustrated in FIGURE 17 to the position illustrated in FIGURE 18 whereby the flanges 56 of the reset member 53 lock with the housing 61 to prevent removal of the reset member 53 therefrom. However, the reset member is adapted to be axially moved relative to the housing 21 because of the spacing between the button portion 54 and flanges 56 of the locking member 53 for a purpose hereinafter described.

With the reset member 53 disposed in the position illustrated in FIGURE 18, it can be seen that the actuating member 49 is adapted to be inserted in the slot 58 thereof into the position illustrated in FIGURE 6 whereby the actuating member 49 locks the reset member 53 in its interlocking rotational position relative to the housing 21 so that the reset member 53 cannot be disassembled therefrom unless the actuating member 49 is removed from the slot 58 of the reset member 53.

After the actuating member 49 has been assembled into the position illustrated in FIGURE 6, the thermostatic member 31 can be disposed in the recesses 32 of the housing 21 and the mounting member or cover 22 can be assembled thereto to hold the thermostatic member 31 in its assembled position as illustrated in FIGURE 6.

The operation of the control device 20 of this invention will now be described.

As long as the thermostatic member 31 of the control device 20 is disposed in the position illustrated in FIGURE 5 and does not sense a temperature at or higher than a temperature that would cause the same to snap over center from the position illustrated in FIGURE 5 to the position illustrated in FIGURE 7, the compression springs 48 are adapted to urge the bridging members 46 and 47 upwardly to bridge the contacts 41, 42 and 43, 44 as the actuating member 49 in cooperation with the thermostatic element 31 does not impede such electrical bridging contact whereby current is adapted to continuously flow between the terminals 33, 34 and the terminals 35, 36 for any desired purpose.

However, should the thermostatic member 31 sense a temperature at or above a predetermined temperature, the same snaps over center from the position illustrated in FIGURE 4 to the position illustrated in FIGURE 7 to cause the actuating member 49 to move the bridging members 46 and 47 downwardly in the manner illustrated in FIGURE 7 to move the bridging members 46 and 47 out of contact with the contacts 41–44 whereby electrical current through the control device 20 of this invention is terminated until the thermostatic member 31 is manually reset from the position illustrated in FIGURE 7 to the position illustrated in FIGURE 5.

In order to reset the thermostatic member 31, the person pushes in on the button portion 54 of the reset member 53 to move the same upwardly from the position illustrated in FIGURE 7 and cause the end 57 of the shaft portion 55 of the reset member 53 to engage the thermostatic member 31 and push the same upwardly in FIGURE 7 to cause the thermostatic member 31 to again snap over center to the position illustrated in FIGURE 5 to permit electrical current to flow through the control device 20 by the closing of the bridging members 46 and 47 against the contacts 41–44 in the manner previously described.

However, it may be found that when the operator presses the reset member 53 to reset the control device 20, the thermostatic member 31 may not have cooled sufficiently to permit the same to be reset from the position illustrated in FIGURE 7 to the position illustrated in FIGURE 5 whereby the actuating member 49 and reset member 53 of this invention are so constructed and arranged that the same prevent the flow of electrical current through the control device 20 when the reset member 53 is moved to its resetting position and the thermostatic member 31 does not snap over center from the position illustrated in FIGURE 7 to the position illustrated in FIGURE 5.

In particular, it can readily be seen in FIGURE 8 of the drawings that when the reset member 53 is moved to its resetting position, the end 62 of the base leg 50 of the actuating member 49 is adapted to extend beyond the free end 57 of the reset member 53 by the force of the compression springs 48 if the thermostatic member 31 is snapped back over center from the position illustrated in FIGURE 7 to the position illustrated in FIGURE 5.

Thus, it can be seen that when the reset member 53 is moved to its resetting position and the thermostatic member 31 does not snap back over center from the position illustrated in FIGURE 7 to the position illustrated in FIGURE 5, the thermostatic member 31 is adapted to hold the surface 62 of the base leg 50 of the actuating member 49 coplanar with the end surface 57 of the reset member 53 whereby the actuating member 49 still holds the bridging members 46 and 47 away from the contacts 41–47 in the manner illustrated in FIGURE 9 so that no electrical current can flow through the control device 20 even though the reset member 53 has been moved to its reset position as illustrated in FIGURE 9.

Therefore, it can be seen that when the thermostatic element 31 has sensed an unsafe condition and has terminated the flow of electrical current through the control device 20 and still senses that an unsafe condition exists, the operator cannot effect closing of the contact means of the control device 20 during an attempted reset operation of the control device 20 so that no hazardous condition can exist during an attempted resetting of the control device 20.

While the control device 20 of this invention has been previously described as having two sets of contact means to be opened and closed in the manner previously described, it is to be understood that the control device 20 of this invention can be readily modified so that only one pair of contact means are provided which are to be bridged by a bridging member of this invention.

In particular, reference is made to FIGURES 10–15 wherein another control device of this invention is generally indicated by the reference numeral 63 and parts thereof similar to the control device 20 previously described are indicated by like reference numerals followed by the reference letter A.

It can readily be seen in FIGURES 10–15 that the control device 63 has the terminal posts 35 and 36 contact carrying plates 39 and 40, electrical contacts 43, 34 and the bridging member 47 and its associated compression spring 48 eliminated so that only electrical contacts 41A and 42A are provided in the housing 21A.

In addition, the actuating member 49A of the control device 63 has the right-hand branch 51A thereof modified from the configuration of the branch 51 of the actuating member 49 to compensate for the missing parts of the control device 63.

However, it is to be understood that the control device 63 of this invention operates in exactly the same manner as the control device 20 previously described except that the control device 63 merely provides a flow of current between the terminals 33A and 34A thereof whereby the various parts of this invention can be utilized to provide either a four terminal device as illustrated in FIGURE 1 or a two terminal device as illustrated in FIGURE 10 with each device 20 and 63 operating in exactly the same manner for the reasons and functions previously set forth.

Therefore, it can be seen that not only does this invention provide an improved manually reset thermostatic control device, but this invention also provides improved parts for such a thermostatic control device or the like.

What is claimed is:

1. In combination, a housing, a control member carried by said housing and having two positions, contact means carried by said housing, a movable contact bridging member carried by said housing, an actuating member means carried by said housing and engageable with said bridging member and said control member, biasing means tending to urge said bridging member into electrical contact with said contact means whereby said bridging member contacts said contact means when said control member is in one position thereof and said actuating member means prevents contact between said contact means and said bridging member when said control member is in the other position thereof, and a movable reset member means carried by said housing for resetting said control member from said other position thereof to said one position thereof, said actuating member means preventing said bridging member from contacting said contact means when said reset member means is moved to its resetting position and said control member does not move from its other position thereof to its one position thereof, said reset member means having a slot therein, said actuating member means being transversely received in said slot and extending beyond opposed sides of said reset member means, said reset member means and said actuating member means being movable in common directions and having adjacent ends each adaptable to be engaged by said control member, said reset member means being adapted to be rotatable relative to said housing and being interlocked with said housing when disposed in one rotatable position relative to said housing, said actuating member means locking said reset member means in said one rotatable position relative to said housing by being disposed in said slot of said reset member means.

2. A combination as set forth in claim 1 wherein said actuating member means is normally urged by said biasing means beyond the free end of said reset member means when said reset member means is moved to its resetting position.

3. A combination as set forth in claim 1 wherein said contact means comprises a pair of spaced stationary contacts.

4. A combination as set forth in claim 1 wherein said contact means comprises two pairs of spaced stationary contacts and wherein said actuating member means is adapted to electrically interconnect together the contacts of each pair thereof.

5. In combination, a housing, a control member carried by said housing and having two positions, contact means carried by said housing, a movable contact bridging member carried by said housing, an actuating member mean carried by said housing and engageable with said bridging member and said control member, biasing means tending to urge said bridging member into electrical contact wtih said contact means whereby said bridging member contacts said contact means when said control member is in one position thereof and said actuating member means prevents contact between said contact means and said bridging member when said control member is in the other position thereof, and a movable reset member means carried by said housing for resetting said control member from said other position thereof to said one position thereof, said actuating member means preventing said bridging member from contacting said contact means when said reset member means is moved to its resetting position and said control member does not move from its other position thereof to its one position thereof, said reset member means having a slot therein, said actuating member means being transversely received in said slot and extending beyond opposed sides of said reset member means, said reset member means and said actuating member means being movable in common directions and having adjacent ends each adaptable to be engaged by said control member, said reset member means comprising a reset button, said reset button having a shaft portion adapted to be rotatably carried by said housing, said shaft portion being adapted to interlock with said housing when said shaft portion is in one rotatable position relative to said housing and being adapted to unlock with said housing when said shaft portion is in another rotatable position relative to said housing, said actuating member means locking said shaft portion in said one rotatable position relative to said housing by being disposed in said slot of said reset member means.

6. A combination as set forth in claim 5 wherein said shaft portion has outwardly directed flange means that is adapted to interlock with said housing when said shaft portion is in said one rotatable position relative to said housing.

7. A combination as set forth in claim 6 wherein said housing has an opening therein receiving said shaft portion and has slot means interconnecting with said opening and being adapted to receive said flange means when said shaft portion is in said other rotatable position relative to said housing.

References Cited

UNITED STATES PATENTS 3,272,946 9/1966 Manecke ----------- 200—113

BERNARD A. GILHEANY, *Primary Examiner.*

R. COHRS, *Assistant Examiner.*